United States Patent [19]

Graver et al.

[11] Patent Number: 4,771,136

[45] Date of Patent: Sep. 13, 1988

[54] BULKHEAD GLAND ASSEMBLY

[75] Inventors: John F. Graver, Charlton; Peter Hawkins, Towcester, both of England

[73] Assignee: Plessey Overseas Limited, Ilford, England

[21] Appl. No.: 916,774

[22] Filed: Oct. 9, 1986

[30] Foreign Application Priority Data

Oct. 9, 1985 [GB] United Kingdom ............... 8524884

[51] Int. Cl.$^4$ ............................................. H05K 9/00
[52] U.S. Cl. .............................. 174/35 R; 174/65 R; 252/503
[58] Field of Search ............ 174/35 R, 35 MS, 65 R, 174/65 G; 248/56; 252/503, 513

[56] References Cited

U.S. PATENT DOCUMENTS

| | | | |
|---|---|---|---|
| 3,127,471 | 3/1964 | Greiner | 174/65 G X |
| 3,282,544 | 11/1966 | Brattberg | 248/56 |
| 3,489,440 | 1/1970 | Brattberg | 248/56 X |
| 4,291,195 | 9/1981 | Blomquist et al. | 174/48 |
| 4,358,632 | 11/1982 | Buch | 248/56 X |
| 4,371,742 | 2/1983 | Manly | 174/36 |

FOREIGN PATENT DOCUMENTS

| | | | |
|---|---|---|---|
| 60-55037 | 3/1985 | Japan | 252/503 |
| 2115238 | 9/1983 | United Kingdom . | |
| 2156169 | 10/1985 | United Kingdom . | |

Primary Examiner—Arthur T. Grimley
Assistant Examiner—David A. Tone
Attorney, Agent, or Firm—Michael F. Oglo; Julian C. Renfro

[57] ABSTRACT

To facilitate installation of cables through bulkheads and other surfaces and to provide electrical protection to apparatus connected to such cables, an assembly comprising electrically conductive blocks (6) clamped in a frame (2) is provided. The mounting blocks 6, each formed of two parts for fitting round a continuous cable length include ribs (11) adapted to grip the sleeving of the cable and an extended rib (10) for contacting screening of the cable. In use, the frame (2) is welded to a bulkhead or other conductive (earthed) element. A section of insulation is removed from the cable and on clamping of the assembly the blocks (6) are compressed together forcing ribs 10 to contact respective screens. Thus any induced electro-magnetic pulses on the cable screens are provided with a low-resistance leakage path.

13 Claims, 3 Drawing Sheets

BULKHEAD GLAND ASSEMBLY

The present invention relates to a bulkhead gland assembly and in particular to such an assembly arranged to provide a reduction in the effects of severe electro-magnetic pulses.

It is known that atmospheric nuclear explosions can cause a high-energy short term electro-magnetic pulse. Such a pulse may cause an induced pulse to travel on screening of transmission cables which is likely to cause severe damage to connected equipment such as radar apparatus, radio transmitter and receiver equipments and other monitoring devices.

To reduce the effect of such electro-magnetic pulses it is necessary for as much of the energy of the pulse as possible to be dissipated before reaching connected equipments. It is known to provide conductive assemblies where cables pass through the bulkhead of a ship, the assemblies having metallic members which contact the screens of cables passing through the assembly to effect connection of the screens to a large conductive surface to effect earthing.

It is also known that to maintain the integrity of the surface through which cables pass the gland assembly should be substantially gas and water tight. Suitable gas tight and/or water tight and/or fire retardant frame assemblies are described in for example UK Specification No: 2040107, U.S. Pat. Nos. 3,489,440 and 3,282,544.

It is an object of the present invention to provide an improved bulkhead gland assembly which is gas and water tight and which has the required high conductivity.

According to the present invention there is provided a bulkhead gland assembly comprising a rigid electrically conductive frame for attachment to a bulkhead, a plurality of block members each of which includes an aperture to permit fitting of a cable, cable retaining means to grip a sheath of a fitted cable and means to contact a screen of such a cable, said plurality of block members being formed of a resilient electrically conductive material, and said frame having clamping means to locate and retain said members.

Preferably each of said block members comprises at least two parts whereby the member may be fitted around a continuous length of cable.

Said cable retaining means may comprise a plurality of ribs extending inwardly of said aperture and said contact means may comprise an elongate rib extending inwardly of said aperture and having greater depth than said retaining ribs.

Said resilient electrically conductive material may have a silicon rubber base incorporating carbon fibres and nickel granules in predetermined proportions.

The carbon fibres may be metal coated fibres in chopped lengths of approximately six millimeters and forming approximately four to five per-cent by weight of the finished material.

The material may be derived from approximately twenty-four percent by weight of liquid silicone rubber, fifty percent by weight of five micron nickel granules, four percent by weight of chopped carbon fibres and twenty-two percent by weight of fifteen micron nickel granules.

Spacing block members of the resilient electrically conductive material may be provided to fill unused space in the frame.

The block members may be arranged in a plurality of rows within the frame, the or each pair of rows being separated by a block retaining means arranged to prevent accidental removal of the block members.

Said block retaining means may be an H section member having arms extending either side of said frame. The block retaining member may be of stainless steel for example.

The clamping means may include a plate member having a chamfered edge adapted to co-operate with a radius edge of the frame member on tightening of said clamping means to assist location and compression of said block members.

Bulkhead gland assemblies in accordance with the invention will now be described by way of example only with reference to the accompanying drawings of which:

Figure 1:
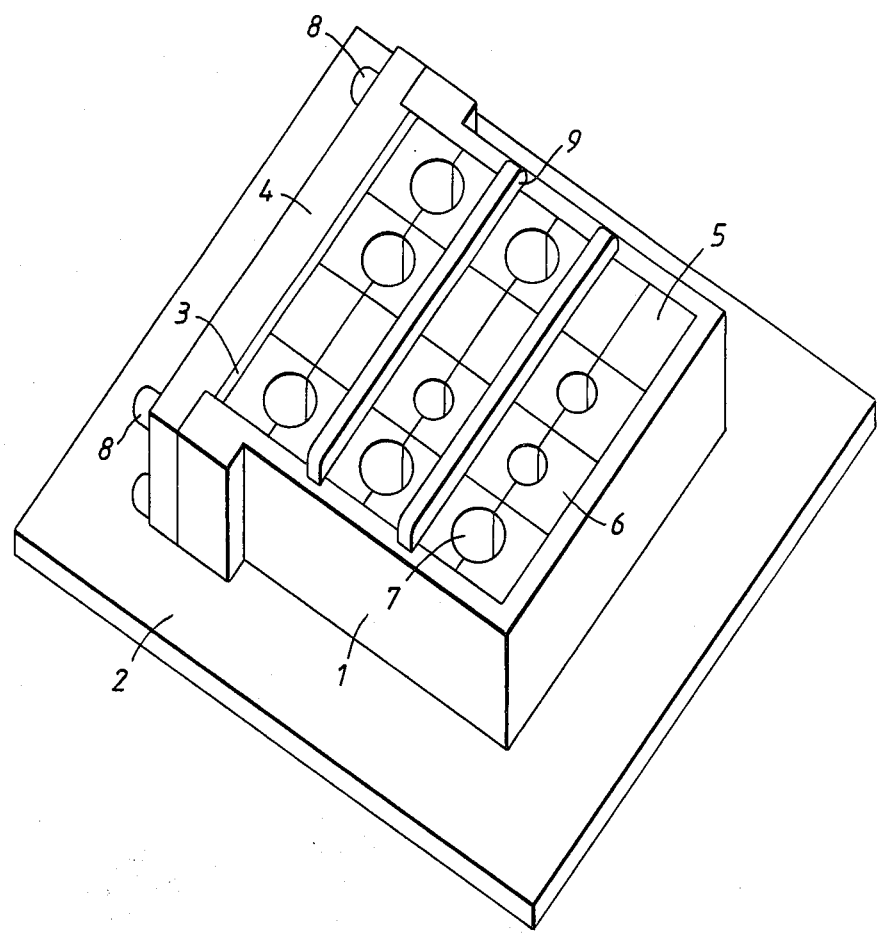
FIG. 1 is a three-dimensional view of a first bulkhead gland assembly in accordance with the invention.

Referring to FIG. 1, the assembly comprises a frame 1 attached to a backplate 2 by welding for example. The frame 1 and backplate 2 are manufactured from metal such as stainless steel for example, the backplate 2 being provided for attachment to a bulkhead by welding or bolting to ensure a good electrical contact with the bulkhead.

The frame 1 has an opening at one end which is closed by a clamping member 4 acting on a clamp plate 3 to compress and retain blocks 5, 6 held in the assembly.

Each of the blocks 5 and 6 is in practice two half-blocks, the blocks 5 acting as spacer members and the blocks 6 including an aperture 7 through which a cable may pass.

The clamping member 4 is held in place by four bolts 8 which fit threaded apertures (not shown) in the frame 1.

As thus far described, the assembly is similar to some of the known assemblies previously mentioned. However, in the present invention the blocks 5 and 6 are formed from a resilient, electrically conductive material such that, when compressed, the blocks due to their resilience form a water tight and gas tight seal between cables (not shown) passing through the apertures 7 and the frame 1. It will be appreciated that, in use, the assembly also provides fire retardance.

On assembly, each cable passing through the bulkhead has a section of insulation stripped from it to expose an area of the cable screening layer. The exposed cable screen is then contacted by a segment of its respective block 6 (as described hereinafter with reference to FIG. 3) to ensure a good electrical contact between all the cable screens, through the blocks 5 and 6, the frame 1, the backplate 2 and the bulkhead to provide a low resistance path for dissipation of induced electro-magnetic pulses.

As has been mentioned the blocks 5 and 6 require both resilience and good conductivity. One suitable block material is based on silicone rubber with the addition of nickel granules and chopped carbon fibres, the material being prepared by the following method:

A base of twenty-four percent by weight of the required final product of liquid silicone rubber is used. To this base fifty percent by weight of five micron nickel granules is added and mixed.

The silicone rubber and nickel mix is poured over four percent by weight of carbon fibres which are in chopped lengths of approximately six millimeters and mixed to produce a material having a plastic consistency.

Finally twenty-two percent by weight of fifteen micron nickel granules is added to the material and mixed to produce a granular material which may be moulded to form the desired block shapes.

It is here noted that metal coated carbon fibres may be used in the mixture and that the percentage figures given are approximate and some slight variation in the percentages is permissible. In practice it has been established that a finished material having 4.33% by weight of carbon fibres gives desired resilience, strength and conductivity parameters.

Referring again to FIG. 1, to prevent dislodging of individual blocks within the matrix when assembled stainless steel 'H' section plates 9 which extend either side of the frame 1 are provided between each row of the blocks 5 and 6. This helps to ensure that if a longitudinal force is applied to one of the cables, the blocks 5 and 6 are retained in position by the arms of the H section.

Figure 2:
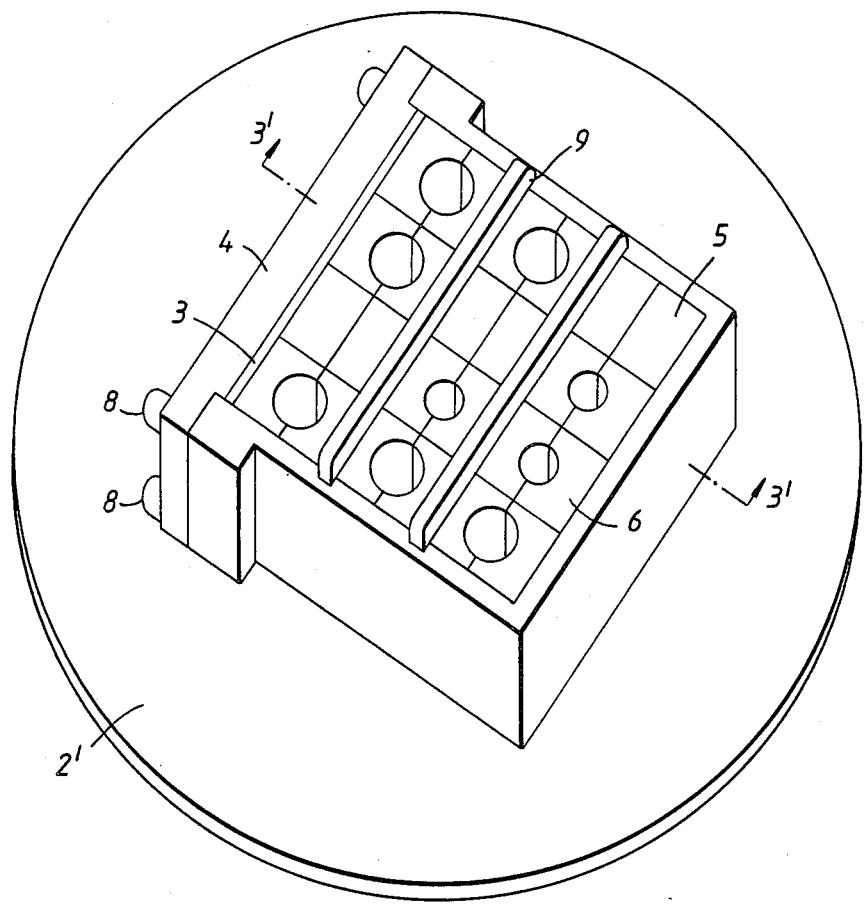
FIG. 2 is a three dimensional view of a second bulkhead gland assembly in accordance with the invention.

Referring now to FIG. 2, the basic components are essentially the same as the corresponding components of the gland of FIG. 1. However, it will be noted that the backplate 2' is circular. Providing the circular backplate 2' avoids significant electrical stress factors at corner points of a backplate such as that shown in FIG. 1.

Figure 3:
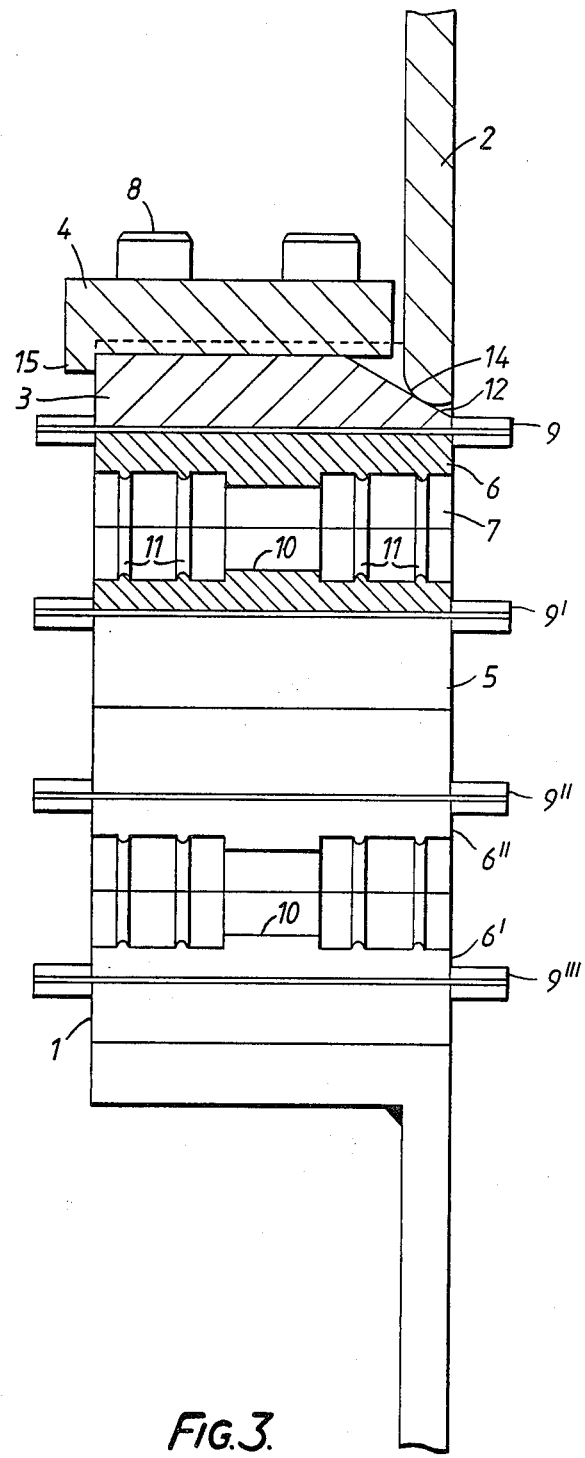
FIG. 3 is a cross-sectional view on the line 3'—3' of FIG. 2.

Turning now to FIG. 3 the construction of the blocks 5 and 6 of FIG. 1 may be seen. Each of the blocks 5 and 6 comprise two identical parts, an upper and a lower part which, in the case of the blocks 6 facilitates fitting a cable through a bulkhead without necessitating cutting and rejoining of the cable. It will be appreciated that the blocks 5 do not need to be separable and may be moulded in a single piece.

The block 6 in which the aperture 7 is provided has inwardly extending annular ribs 11 which grip sleeving of a fitted cable, and an inwardly extending annular portion 10 which is arranged to contact the screen of the fitted cable.

The construction and operation of the plates 9 may also be seen.

In use, when the baseplate 2 is attached to a bulkhead through which cables are to pass, the gland is assembled first by placing one of the H section plates 9''' into the base of the framework 1 and inserting the lower halves 6' of the first layer of blocks into the upper part of the H section plate. A short length of insulation is stripped from the cable to be fitted to expose a length of the screening wire of comparable size to the length of the annular portion 10.

The upper halves 6'' of the first layer of blocks 5, 6 are now fitted followed by a further H section plate 9''. Other layers of blocks 5,6 interspersed by plates 9 are fitted in similar manner until the framework is full. The clamp plate 3 and clamping member 4 are fitted above the assembled blocks and tightened down using the screws 8.

It will be noted that, on tightening down of the clamping member 4, the blocks 5,6 are slightly compressed causing the ribs 11 to grip the sleeving of inserted cables and the portions 10 to contact the exposed screens of the inserted cables. Any air gaps between the blocks also tend to be eliminated which helps to prevent flames spreading through a bulkhead in the event of fire.

A feature of the present invention is the construction of the clamp plate 3 which has a wedge shaped rear edge 12 adapted to co-operate with a radiussed edge 14 of the backplate 2. Thus, when the gland is assembled, the wedge 12 is positioned under the radius 14. A front lip 15 of the clamping member 4 acting on the front edge of the clamp plate 3 will force the wedge 12 further under the radius 14 as the screws 8 are tightened. This facilitates assembly of the gland since it is not necessary for the entire depth of the clamp plate 3 to be manually forced under the edge of the backplate 2 in the first instance and ensures electrical continuity between the plate 3 and the backplate 2 when the unit is assembled.

It will be appreciated that, while as herein described, the assembly is particularly suited to use at a bulkhead of a ship or aircraft for example, the gland may also be used in walls of screened rooms. The unit may also be located in walls of unscreened rooms provided that a good earthing contact, such as through reinforcing metalwork of concrete walls, is available.

Many advantages of the gland of the present invention in regard to water and gas tightness and fire retardant effects for example in addition to conductivity and ease of assembly will be realised.

We claim:

1. A bulkhead gland assembly comprising a rigid electrically conductive frame for attachment to a bulkhead, a plurality of block members each of which includes an aperture to permit fitting of a cable, cable retaining means to grip a sheath of fitted cable and means to contact a screen of such a cable, said plurality of block members being formed of a resilient electrically conductive material, and said frame having clamping means to locate and retain said members, in which the clamping means comprises a plate member having a chamfered edge, the chamfered edge cooperating with a radius edge of the frame member on tightening of the clamping means to assist location and compression of the block member.

2. A bulkhead gland assembly as claimed in claim 1 wherein at least one of the block members comprises at least two parts each of which includes a respective partial aperture to permit assembly of the member around a continuous length of cable.

3. A bulkhead gland assembly as claimed in claim 1 wherein said cable retaining means comprises a plurality of rib members extending inwardly of the aperture.

4. A bulkhead gland assembly as claimed in claim 3 wherein said contact means comprises an elongate rib member extending inwardly of said aperture said elongate rib member extending inwardly a greater distance than said plurality of rib members.

5. A bulkhead gland assembly as claimed in claim 1 in which the assembly further comprises block members of resilient electrically conducting material arranged to fill unused space within the frame.

6. A bulkhead gland assembly as claimed in claim 1 in which the block members are arranged in a plurality of rows within the frame, the assembly further comprising block retaining means interspersed between the or each pair of rows, the block retaining means being arranged to inhibit accidental removal of the block members.

7. A bulkhead gland assembly as claimed in claim 6 wherein the block retaining means comprises an H section member which has arms extending on either side of the frame.

8. A bulkhead gland assembly as claimed in claim 7 in which the block retaining member is formed from stainless steel.

9. A bulkhead gland assembly for reducing the effects of high-energy short term electromagnetic pulses, the assembly comprising a rigid electrically conductive frame for attachment to a bulkhead, said frame including a clamping means, a plurality of block members for location and retention by the clamping means, each block member including an aperture to permit fitting of a cable and, means within the aperture to contact a screen of the cable, each block member being formed of resilient electrically conductive material, the material comprising a mix of up to about one quarter in weight of silicone rubber, up to about three quarters in weight of nickel granules and up to approximately four percent in weight of carbon elements such that the conductivity of the material is high in an uncompressed condition sufficient to dissipate high energy electromagnetic pulses flowing through the cable.

10. A bulkhead gland assembly as claimed in claim 9 wherein the carbon elements are metal coated carbon fibres.

11. A bulkhead gland assembly as claimed in claim 9 wherein said carbon elements are chopped carbon fibres substantially six millimetres in length.

12. A bulkhead gland assembly as claimed in claim 11 wherein said carbon fibres form between approximately four and five per cent by weight of the conductive material.

13. A bulkhead gland assembly as claimed in claim 9 wherein the electrically conductive material is derived from a mix comprising substantially twenty four percent by weight of liquid silicone rubber, fifty percent by weight of five micron nickel granules, four percent by weight of carbon elements and twenty two percent by weight of fifteen micron nickel granules.

* * * * *